United States Patent
Novack et al.

(10) Patent No.: US 10,514,499 B2
(45) Date of Patent: Dec. 24, 2019

(54) PHOTONIC CHIP WITH AN INPUT WAVELENGTH FILTER

(71) Applicant: Elenion Technologies, LLC, New York, NY (US)

(72) Inventors: Ari Novack, New York, NY (US); Ruizhi Shi, New York, NY (US); Alexandre Horth, Astoria, NY (US); Ran Ding, New York, NY (US); Michael J. Hochberg, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 4 days.

(21) Appl. No.: 15/875,559

(22) Filed: Jan. 19, 2018

(65) Prior Publication Data
US 2019/0227230 A1 Jul. 25, 2019

(51) Int. Cl.
| | | |
|---|---|---|
| G02B 6/12 | (2006.01) |
| G02B 6/42 | (2006.01) |
| H04Q 11/00 | (2006.01) |
| H04J 14/02 | (2006.01) |
| G02B 6/122 | (2006.01) |
| H04B 10/43 | (2013.01) |
| G02B 6/27 | (2006.01) |

(52) U.S. Cl.
CPC ....... *G02B 6/12016* (2013.01); *G02B 6/1228* (2013.01); *G02B 6/2773* (2013.01); *G02B 6/4206* (2013.01); *G02B 6/4215* (2013.01); *H04B 10/43* (2013.01); *H04J 14/0278* (2013.01); *H04Q 11/0005* (2013.01)

(58) Field of Classification Search
CPC .... G02B 6/1228; G02B 6/43; G02B 6/12007; G02B 6/4206; G02B 6/4215; G02B 6/2773; H04Q 11/0005; H04J 14/0278; H04B 10/43
See application file for complete search history.

(56) References Cited

U.S. PATENT DOCUMENTS

| | | | |
|---|---|---|---|
| 5,805,751 A | 9/1998 | Kewitsch et al. | |
| 6,785,447 B2 * | 8/2004 | Yoshimura | G02B 6/10 257/E23.01 |
| 7,200,308 B2 | 4/2007 | Hochberg et al. | |
| 7,643,714 B2 | 1/2010 | Hochberg et al. | |
| 7,738,853 B2 | 6/2010 | Eddy et al. | |
| 7,751,655 B2 | 7/2010 | Fattal et al. | |
| 7,760,970 B2 | 7/2010 | Baehr-Jones et al. | |
| 7,877,016 B2 * | 1/2011 | Nagarajan | H04B 10/43 398/135 |
| 7,894,696 B2 | 2/2011 | Baehr-Jones et al. | |

(Continued)

*Primary Examiner* — Thomas A Hollweg
*Assistant Examiner* — Mary A El-Shammaa
(74) *Attorney, Agent, or Firm* — Stratford Managers Corporation

(57) ABSTRACT

A photonic chip includes a device layer and a port layer, with an optical port located at the port layer. Inter-layer optical couplers are provided for coupling light between the device and port layers. The inter-layer couplers may be configured to couple signal light but block pump light or other undesired wavelength from entering the device layer, operating as an input filter. The port layer may accommodate other light pre-processing functions, such as optical power splitting, that are undesirable in the device layer.

20 Claims, 11 Drawing Sheets

(56) References Cited

U.S. PATENT DOCUMENTS

| | | |
|---|---|---|
| 8,311,374 B2 | 11/2012 | Hochberg et al. |
| 8,390,922 B1 | 3/2013 | Baehr-Jones et al. |
| 8,410,420 B1 | 4/2013 | Hochberg et al. |
| 8,428,401 B2 * | 4/2013 | Tilly ................ G02B 6/122 |
| | | 385/14 |
| 8,625,942 B2 | 1/2014 | Na et al. |
| 8,798,406 B1 | 8/2014 | Hochberg et al. |
| 8,818,141 B1 | 8/2014 | Hochberg et al. |
| 9,274,275 B2 | 3/2016 | Webster et al. |
| 9,335,480 B1 | 5/2016 | Celo |
| 9,571,200 B2 | 2/2017 | Saathoff et al. |
| 9,588,298 B2 | 3/2017 | Novack et al. |
| 9,601,819 B2 | 3/2017 | Herbsommer et al. |
| 9,705,630 B2 * | 7/2017 | Liboiron-Ladouceur ........... |
| | | H04J 14/04 |
| 2004/0013357 A1 | 1/2004 | Bandyopadhyay |
| 2007/0086703 A1 * | 4/2007 | Kirk ................ G02B 6/12007 |
| | | 385/37 |
| 2007/0189666 A1 | 8/2007 | Kornilovich |
| 2007/0258677 A1 * | 11/2007 | Chigrinov .......... G02B 6/12007 |
| | | 385/15 |
| 2011/0116741 A1 | 5/2011 | Cevini et al. |
| 2012/0183250 A1 | 7/2012 | Cheben et al. |
| 2015/0071633 A1 * | 3/2015 | Mehrvar ............. H04J 14/0212 |
| | | 398/49 |
| 2015/0234138 A1 * | 8/2015 | Sorger ................ G02B 6/3596 |
| | | 385/16 |
| 2016/0012176 A1 | 1/2016 | Liu et al. |
| 2016/0013609 A1 * | 1/2016 | Doerr ................ H01S 3/10015 |
| | | 372/20 |
| 2016/0033765 A1 | 2/2016 | Liu et al. |
| 2016/0091665 A1 * | 3/2016 | Jones ................ H04Q 11/0005 |
| | | 385/2 |
| 2016/0131862 A1 * | 5/2016 | Rickman ............. G02B 6/12019 |
| | | 385/1 |
| 2016/0246005 A1 * | 8/2016 | Liu ...................... G01J 3/0218 |
| 2017/0023733 A1 * | 1/2017 | Florjanczyk ....... G02B 6/12004 |
| 2017/0139142 A1 | 5/2017 | Patel et al. |
| 2017/0192171 A1 * | 7/2017 | Shi ...................... G02B 6/1228 |
| 2017/0205581 A1 * | 7/2017 | de Boer ................ G02B 6/305 |

* cited by examiner

PHOTONIC CHIP WITH AN INPUT WAVELENGTH FILTER

FIELD OF THE INVENTION

The invention generally relates to photonic integrated circuits, and more particularly relates to a photonic chip with a two-layer wavelength selective coupler at its optical interface.

BACKGROUND OF THE INVENTION

Photonic integrated circuits are widely used in optical communication systems, in particular to implement optical transceivers. An optical transceiver may include an optical transmitter for transmitting optical signals into a fiber optic link, and an optical receiver for receiving optical signals from the fiber optical link. Often the optical link includes an optical amplifier, such as an erbium-doped fiber amplifier (EDFA) in the vicinity of the optical transceiver, which has to be optically pumped by pump light, which may propagate towards the transceiver or away from the transceiver. Typically an optical isolator is required either at the optical link side or at the transceiver side of the EDFA to filter out the pump light. This is illustrated by way of example in FIG. 1, which shows an optical transceiver 10 including an optical transmitter (Tx) 12 and optical receiver (Rx) 11, and two EDFAs 21 connecting them to an optical link 50. Pump lasers 23 generate pump light, which is then fed into each EDFA 21 through a wavelength division multiplexing (WDM) coupler 31 for optically pumping the respecting EDFAs 21 in a counter-propagating fashion. Optical isolators 41 are included in each of the Rx and Tx paths to prevent the pump light from entering either the optical link 50 or the transceiver PIC. Although pumping an EDFA 21 in the direction of the transceiver allows to eliminate an optical isolator at the optical link side of the EDFA, the pump light entering a semiconductor layer of a PIC implementing the transceiver may be absorbed in that layer, causing a reduction in the optical power of signal light through free carrier absorption.

This general scheme, although capable of performing its function, requires however a relatively large number of optical components, which increases its cost and size.

SUMMARY OF THE INVENTION

An aspect of the present disclosure relates to a method for blocking a second wavelength $\lambda_2$ from a device layer of a photonic chip that is configured to operate at a first wavelength $\lambda_1$. The method may comprise: a) forming a port waveguide for connecting to an external system in a second layer of the photonic chip that is spaced from the device layer, the external system comprising a source of the second wavelengths, and b) optically coupling the port waveguide to a device waveguide disposed in the device layer in a wavelength selective manner so that the device waveguide is optically coupled to the port waveguide at the first wavelength $\lambda_1$ but is substantially optically decoupled at the second wavelength $\lambda2$, so that the second wavelengths $\lambda_2$ received in the port waveguide remains in the port waveguide without being coupled into the device layer.

An aspect of the present disclosure relates to a photonics chip that comprises a port layer, a device layer disposed above or below the port layer, and an optical port disposed at the port layer for connecting optically to an external optical system at a first wavelength $\lambda_1$, the external optical system including a source of a second wavelength $\lambda_2$. A port waveguide is disposed in the port layer in optical communication with the optical port. A device waveguide is disposed in the device layer in optical communication with the port waveguide at the first wavelength $\lambda_1$, so as to be substantially optically decoupled from the port waveguide at the second wavelength $\lambda_2$. In at least some implementations, the device layer is a semiconductor layer and the port layer is a dielectric layer. In at least some implementations, the device layer may be absorptive at the second wavelength. In at least some implementations the port layer may be transparent at the first and second wavelengths.

An aspect of the present disclosure relates to a method for blocking pump light from a device layer of a photonic chip. The method comprises a) forming an optical port of the photonic chip in a dielectric layer thereof that is transparent to the pump light and signal light, and b) optically coupling the device layer with the optical port with a two-layer wavelength-selective coupler configured to couple the device and dielectric layers at the signal wavelength $\lambda_1$ while blocking the pump wavelengths $\lambda_2$ received into the dielectric layer from coupling into the device layer.

An aspect of the present disclosure relates to a method for blocking pump light from a device layer of a photonic chip. The method comprises a) forming an optical port of the photonic chip in a second layer thereof that is formed from a different material than the device layer, and b) optically coupling the device layer with the optical port with a two-layer wavelength-selective coupler configured to couple the device and second layers at the signal wavelength $\lambda_1$ while blocking the pump wavelengths $\lambda_2$ received into the second layer from coupling into the device layer.

An aspect of the present disclosure relates to a photonic chip comprising a device layer and a port layer, the device layer comprising one or more device waveguides, the port layer comprising an optical port and one or more port waveguides, wherein the one or more port waveguides are disposed to be in optical communication with the one or more device waveguides so as to form one or more two-layer optical couplers for coupling light between the port and device layers. The one or more two-layer couplers may be configured for coupling light between the device and port layers in a wavelength selective manner.

An aspect of the present disclosure relates to a photonic chip comprising a device layer and a port layer, the device layer comprising first and second device waveguides, the port layer comprising an optical port, first and second port waveguides, and an optical splitter disposed to optically connect the optical port with the first and second port waveguides. The first and second port waveguides are disposed to be in optical communication with the first and second device waveguides, respectively, so as to form first and second two-layer optical couplers for separately coupling pre-defined portions of light received in the optical port into the first and second device waveguides.

An aspect of the present disclosure relates to a method for processing input light received in a photonic chip comprising a device layer, the method comprising: a) coupling the input light into a port layer of a photonic chip that is spaced from the device layer; b) splitting the input light into two or more light portions in the port layer; and, c) separately coupling the two or more light portions from the port layer into two or more waveguides formed in the device layer of the photonic chip.

An aspect of the present disclosure relates to a photonic chip that comprises a plurality of port layers and a device layer disposed above or below the port layers. The plurality of port layers comprises a plurality of port waveguides forming a composite optical port at a facet of the photonic chip for connecting optically to an external optical system at a first wavelength $\lambda_1$, the external optical system including a source of a second wavelength $\lambda_2$. The device layer comprises a device waveguide disposed in optical communication with one of the port waveguides at the first wavelength $\lambda_1$, while being substantially optically decoupled from the one of the port waveguides at the second wavelength $\lambda_2$. The plurality of port waveguides may be configured to concentrate light of at least the first wavelength $\lambda_1$ at the one of the port waveguides away from the facet of the photonic chip.

BRIEF DESCRIPTION OF THE DRAWINGS

Embodiments disclosed herein will be described in greater detail with reference to the accompanying drawings, which may be not to scale and in which like elements are indicated with like reference numerals, and wherein.

DETAILED DESCRIPTION

Figure 1:
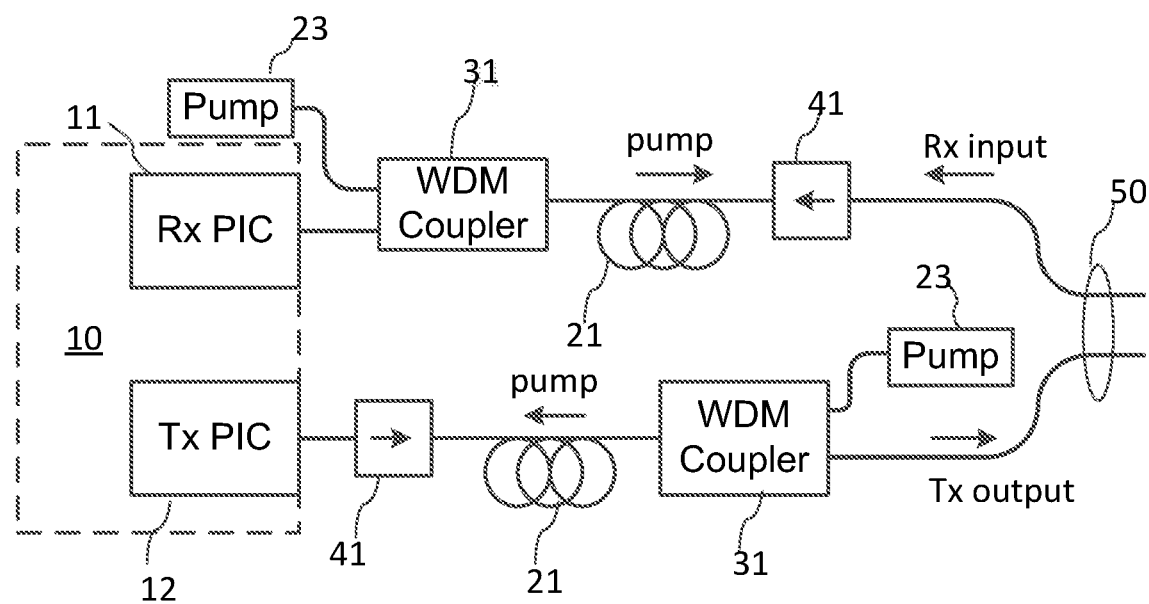
FIG. 1 is a schematic block diagram illustrating an optical transceiver site with an optical post-amplifier and pre-amplifier.

In the following description, for purposes of explanation and not limitation, specific details are set forth, such as particular optical circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:
GaAs Gallium Arsenide
InP Indium Phosphide
PIC Photonic Integrated Circuit
SOI Silicon on Insulator
MUX Multiplexer
DEMUX Demultiplexer
WDM Wavelength Division Multiplexing
DWDM Dense Wavelength Division Multiplexing
EDFA Erbium Doped Fiber Amplifier In the following description, the term "light" refers to electromagnetic radiation with frequencies in the visible and non-visible portions of the electromagnetic spectrum. The term "optical" relates to electromagnetic radiation in the visible and non-visible portions of the electromagnetic spectrum. The terms "first", "second" and so forth are not intended to imply sequential ordering, but rather are intended to distinguish one element from another, unless explicitly stated. Similarly, sequential ordering of method steps does not imply a sequential order of their execution, unless explicitly stated. The word 'using', in a description of a method or process performed by an element, circuit, or device, refers to an action performed by the element, circuit, or device itself or by a component thereof rather than by an external agent, unless is explicitly stated otherwise.

One aspect of the present disclosure relates to interfacing a photonic chip having a device layer implementing a PIC with an external optical system or subsystem that includes an optical amplifier pumped at a pump wavelength that can propagate towards the photonic chip. The term 'photonic chip' is used herein to refer to a chip configured to operate with electromagnetic radiation in the wavelength range from near ultra-violet to infra-red, including the wavelengths used in optical communications. The present disclosure provides an input/output port implemented in a layer of the chip, termed the second layer or the port layer, that is different from the device layer, and a two-layer optical coupler implemented within the chip that directs only the signal wavelength or wavelengths into the device layer of the chip but not the pump wavelength, which remains in the port layer or is routed elsewhere without being coupled into the device layer of the chip. A broader aspect of the present disclosure relates to interfacing a photonic chip with an external optical system in a way that selectively blocks one or more wavelengths that may be present in the external system from entering a specific layer of the chip while allowing coupling between the external system and that layer at one or more other wavelengths. In at least some embodiments the specific layer comprises semiconductor material that may or may not be transparent at the wavelength or wavelengths being blocked.

Figure 2A:
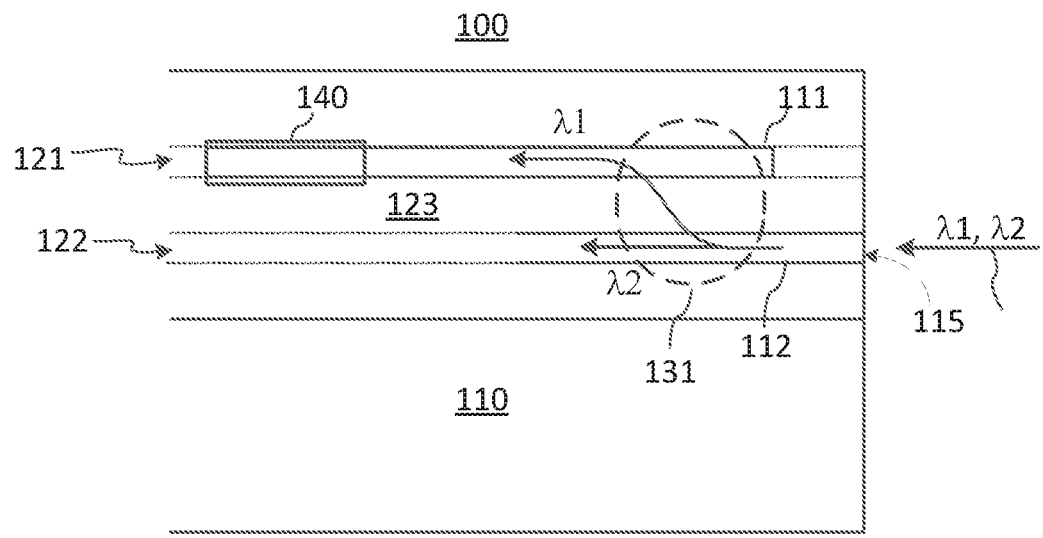
FIG. 2A is a schematic diagram illustrating a vertical cross-section of an optical chip with separate port and device layers.
Figure 3:
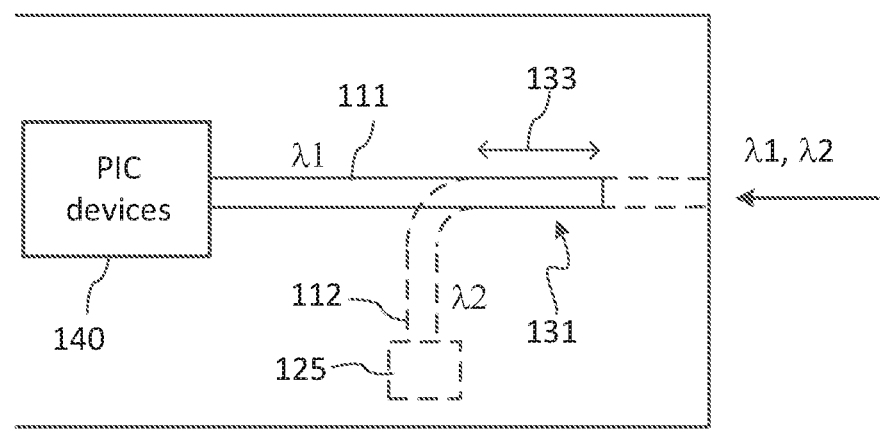
FIG. 3 is a schematic plan view of the optical chip of FIG. 2.

With reference to FIGS. 2A and 3, there is illustrated a portion of a photonic chip 100 with a port 115 for interfacing an external optical system (not shown); FIG. 2A shows photonic chip 100 in a side view, while FIG. 3 shows it in a plan view. Photonic chip 100 includes a device layer 121 in which one or more photonic devices 140 may be implemented, or to which the one or more photonic devices 140 may be optically coupled, and a second layer 122, which may also be referred to herein as the port layer. The photonic device 140 may include, or be in the form of, any optical device suitable for implementing in a PIC, including but not limited to a photodetector, an optical transmitter, an optical modulator, a MUX/DEMUX, an optical hybrid, etc. The device layer 121 and the second layer 122 may be disposed over a substrate 110 at different heights therefrom, and may be separated by a third layer 123, which may be thin enough to allow for an evanescent coupling between the device layer 121 and the second layer 122 at a signal wavelength $\lambda_1$, which may also be referred herein as the first wavelength. In FIG. 3 elements implemented in the device layer 121 are shown with solid lines, while elements in the second layer 122 are shown with dashed lines. The intermediate layer 123 may be made of a material having a smaller refractive index at wavelengths of interest than the device layer 121 and the port layer 122. The device layer 122 includes a first waveguide 111, or at least a core thereof, which is disposed to couple light of the first wavelength $\lambda_1$ in or out of the optical device 140. The first waveguide may also be referred to herein as the (first) device-layer waveguide, the first device waveguide, or simply as the device waveguide. A port waveguide 112 for connecting optically to an external optical system (not shown) is formed in the second layer 122.

In the illustrated embodiment port waveguide 112 terminates at an edge of the photonic chip 100 forming an edge port 115 through which light may enter the photonics chip 100 or be transmitted therefrom. In other embodiments chip 100 may communicate with the external optical system through other input/output port arrangements provided at the second layer 122, including but not limited to a groove etched in the second layer 122 that may enable vertical coupling.

Figure 2B:
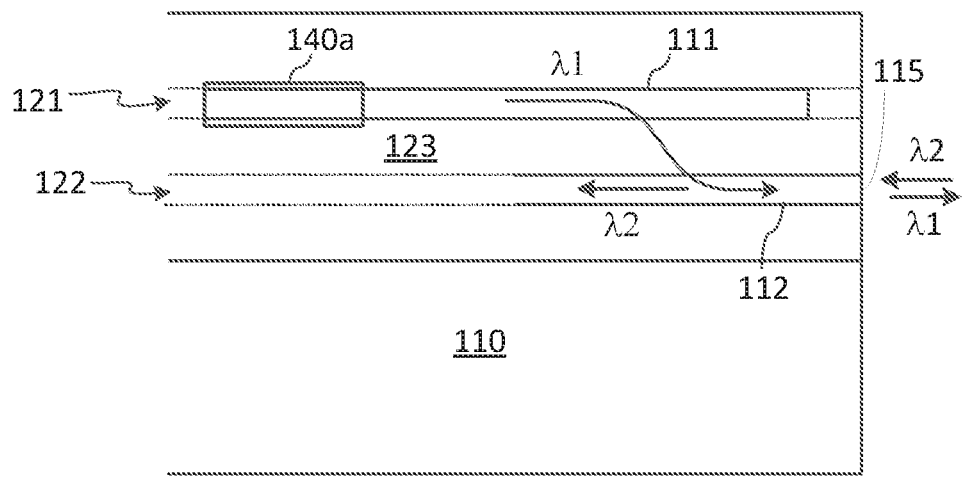
FIG. 2B is a schematic diagram illustrating a vertical cross-section of an optical chip with separate port and device layers.

FIGS. 2A and 3 show the photonic chip 100 receiving light from the external system, although in other embodiments photonic chip 100 may be transmitting light of the first wavelength $\lambda_1$ for coupling into the external system, as illustrated in FIG. 2B. In either case the external system may also include a source of a second wavelength $\lambda_2$ that may enter photonic chip 100 via port 115 but is to be prevented from reaching the device layer 121.

The first device waveguide 111 and/or the port waveguide 112 may be configured so as to be optically coupled at the first wavelength $\lambda_1$ but substantially optically decoupled at the second wavelength $\lambda_2$. In one embodiment the first device waveguide 111 may be routed so that a length 133 thereof forms a first two-layer wavelength selective optical coupler 131, which may also be termed an inter-layer optical coupler, with a section of the port waveguide 112. The first two-layer coupler 131 may be configured to selectively transfer the first wavelength $\lambda_1$ between the first waveguide 111 and the port waveguide 112 while substantially preventing the second wavelengths $\lambda_2$, which may be coupled into the port waveguide 112 from the external optical system through port 115, from being coupled into the first waveguide 111. The terms "substantially optically decoupled" or "substantially preventing" as used herein mean that, although a small portion of the second wavelength $\lambda_2$ may be still coupled from the port layer to the device layer, the coupling loss associated with that coupling is at least 10 dB greater for the second wavelength than for the first wavelength, and preferably at least 15 dB greater.

In one embodiment coupler 131 may be a directional coupler formed by a length portion of the first waveguide 111 that is disposed directly over or under a coupling portion or section of the port waveguide 112 along a coupling section 133. The length l of the coupling section of the two waveguides 111, 112 may be selected so that the first waveguide 111 and the port waveguide 112 are optically coupled at the first wavelength $\lambda_1$ and optically decoupled at the second wavelengths $\lambda_2$. After the coupling section 133, waveguides 111 and 112 may be routed away from each other.

In representative embodiments the device layer 121 may be formed from one or more layers of a semiconductor material or materials, and the port layer 122 may be a layer of a dielectric material, or may be formed from one or more layers of a different semiconductor material or material, which in some embodiments may have a greater bandgap than the device layer 121. In some embodiments the device layer 121 is transparent at the first wavelength but may be absorptive at the second wavelength, while the port layer 122 is transparent at both the first and second wavelengths. In other embodiments the device layer 121 may be transparent at both the first and second wavelengths, while the port layer is transparent at the first wavelength but may be absorptive at the second wavelength. When the port layer 122 is sufficiently absorptive at the second wavelength, the coupler 131 may not have to discriminate between the first and second wavelengths.

In example embodiments described hereinbelow the photonic chip 100 may be a silicon-based chip, for example formed using SOI technology, and the device layer 121 may be a silicon (Si) layer, but it can also be a layer of a different semiconducting or dielectric material in other embodiments. In the silicon platform the second layer 122 may be for example a layer of silicon nitride (SiN), and the intermediate layer 123 may be a silicon dioxide (SiO2) layer. In other embodiments the port layer 122 may be made of a different material, such as for example silicon oxynitiride, polymers or polysilicon. By way of example the first wavelength $\lambda_1$ may be any optical communication wavelength, such as one of the communication wavelengths in the 1550 nm wavelength range, while the second wavelength $\lambda_2$ may be a pump wavelength of an EDFA and be in the 980 nm wavelength range, although other wavelengths combinations are also possible.

In at least some implementations the two-layer wavelength selective coupler 131 enables coupling chip 100 to an EDFA-containing external optical system in a wavelength selectively manner so that the pump light is effectively blocked from the device layer of the chip even without an external optical isolator. One difficulty associated with the pump light entering a device layer of a chip is that it may be of a very high power compared to the signal light, and may be absorbed in the device layer 121, in particular when the device layer 121 is made of silicon or another semiconductor material that is absorptive in the wavelength range of the optical pump. The absorption of the high power pump light causes a generation of a large number of carriers that may then absorb the signal wavelength $\lambda_1$. This effect could be very significant, resulting in more than 3 dB of signal power loss. By coupling chip 100 to the external system not at the semiconductor device layer but at a second layer that is separate from the device layer, and using the coupler 131 to selectively direct only the signal light into the device layer, the pump light may be prevented from entering the device layer and thus prevented from inducing the additional signal loss.

In some embodiments an optically absorptive element 125 may be disposed at the second layer 122 to absorb light of the second wavelength $\lambda_2$, which remains in the second waveguide 112 after coupler 131. The optically absorptive element 125 may be formed, for example, with material that is absorptive at the second wavelength, such as for example silicon, doped silicon, or metal such as copper or aluminum. In other embodiments the second wavelength may be simply routed away from the optical device 140 or any other optical device that may be formed in the chip.

In FIGS. 2A and 3, arrows labeled with "$\lambda 1$" and "$\lambda 2$" illustrate the direction of light propagation for an embodiment of chip 100, or a mode of its operation, where the chip receives the first and second wavelengths from an external optical system, with the first wavelength $\lambda_1$ being directed within the chip from the port layer to the device layer while the second wavelength $\lambda_2$ stays predominantly with the port layer or being directed elsewhere other than the device layer. It will be appreciated that the same double-layer arrangement and tow-layer coupler 131 may be used to prevent the second wavelength $\lambda_2$, for example of an optical pump, from entering a device layer of optical chip that in operation transmits, rather than receives, the first wavelength $\lambda_1$. This is schematically illustrated in FIG. 2B, which shows a version of chip 100 of FIGS. 2A, 3 with an optical device 140a in the device layer 121 that is configured to transmit the first wavelengths $\lambda 1$, which is then coupled from the first device waveguide 111 into the port waveguide 112 and transmitted from the chip via output port 115. The second wavelength $\lambda_2$, which may enter the port waveguide 112 from port 115, propagates in the port waveguide 112 but doesn't enter the device layer 111 in accordance with the design of coupling sections of the port and device waveguides 112, 111.

Figure 4:
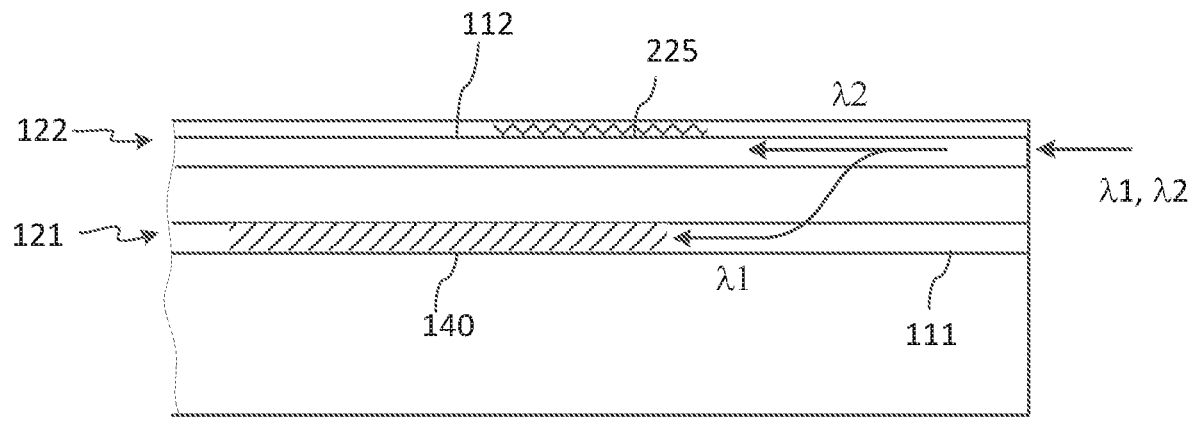
FIG. 4 is a schematic diagram illustrating a vertical cross-section of a variant of the optical chip of FIG. 2 with the port layer above the device layer.

FIGS. 2A-3 illustrate an embodiment wherein the second layer 122 is disposed over the device layer 121, and therefore the port waveguide 112 is located below the first waveguide 111 closer to the substrate 110. This relative arrangement of the layers is not a requirement, and embodiments may be envisioned in which the second layer 112 is disposed over the device layer 121. Such an embodiment is illustrated in FIG. 4, which also shows by way of example a metal layer 225 that may be disposed over the port waveguide 112 to implement an absorptive element for absorbing the second wavelength $\lambda_2$.

Figure 5:
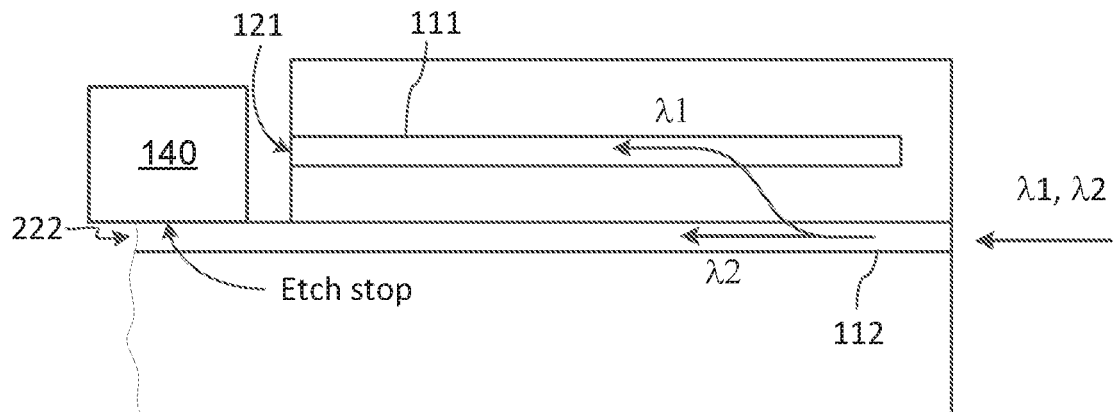
FIG. 5 is a schematic diagram illustrating a vertical cross-section of a variant of the optical chip of FIG. 2 with an etch stop layer serving as the port layer.

Referring now to FIG. 5, there is illustrated an embodiment wherein the second layer 122 is an etch-stop layer that is used in chip manufacturing to define another feature of the photonic chip, for example a feature of the optical device 140. Conveniently, a layer of SiN is often used to provide an etch stop in a silicon photonics platform. Such an etch stop layer 222, when disposed suitably close to the device layer 121 to allow for evanescent optical coupling therebetween at the operating wavelength can be used as the second or port layer to form the port waveguide 112 therein, as illustrated in FIG. 5.

Figure 6:
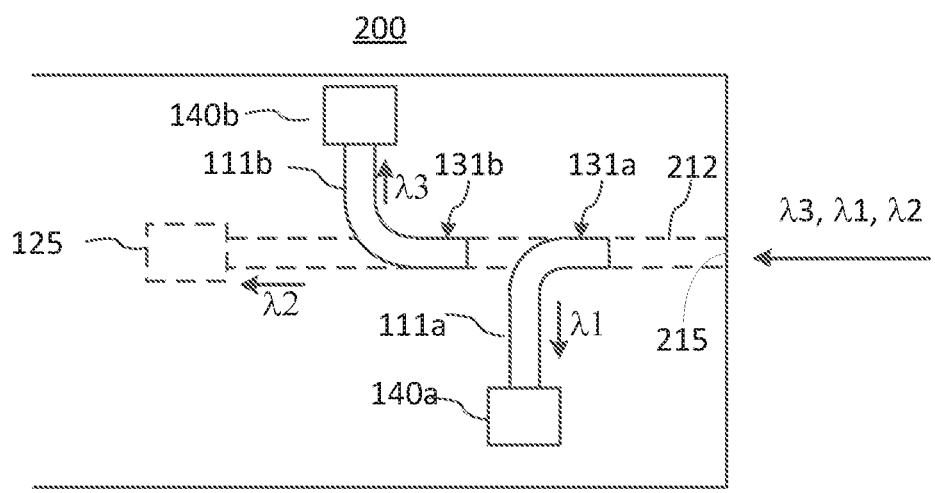
FIG. 6 is a schematic diagram illustrating a plan view of an optical chip with an input/output waveguide in the port layer coupled to two separate waveguides in the device layer.

Referring now to FIG. 6, there is illustrated in a plan view a portion of a photonics chip 200 which includes a device layer and a second layer below the device layer, as generally described hereinabove with reference to FIGS. 2A and 3. In FIG. 6 elements implemented in the device layer are shown with solid lines, while elements in the second layer are shown with dashed lines. The device layer includes a first device waveguide 111a in optical communication with a first optical device 141a, and a second device waveguide 111b in optical communication with a second optical device 140b. The second or port layer includes a port waveguide 212 terminating at one end with an edge coupler 215 forming a port for connecting to an external optical system (not shown). Port waveguide 212 may optionally terminate at another end with an absorber 125, or be coupled thereto. The first device waveguide 111a that is formed in the device layer forms a first two-layer wavelength selective coupler 131a with a section of the port waveguide 212. The second port waveguide 111b, also formed in the device layer, forms a second two-layer wavelength selective coupler 131b with a different section of the port waveguide 212. Couplers 131a, 131b may be generally as described hereinabove with reference to FIGS. 2 and 3. The first optical device 140a may be operating at the first wavelength $\lambda_1$, while the second optical device 140b may be operating at a third wavelength $\lambda_3$. The first coupler 131a may be configured so that the first and port waveguides are coupled at the first wavelength $\lambda_1$ but not at the second and third wavelength $\lambda_2$, $\lambda_3$, so that the first wavelength gets transferred between the waveguides 112, 111a while each of the second wavelength $\lambda_2$ and the third wavelength $\lambda_3$ remain within the same waveguide past the first coupler 131a. The second coupler 131b may be configured so that the second and port waveguides 111b, 112 are coupled at the third wavelength $\lambda_3$ but not at the first and second wavelength $\lambda_1$, $\lambda_2$, so that the third wavelength gets transferred between the waveguides 112, 111b while the second wavelength $\lambda_2$ remains within the port waveguide 112 past the second coupler 131b. Thus the first and second two-layer couplers 131a, 131b provide for a MUX-DEMUX functionality to chip 200. By way of example, $\lambda_2$ may be a 980 nm pump wavelength of an external optical amplifier, and the first and third wavelengths $\lambda_1$, $\lambda_3$ may be two different communication wavelengths, for example in the 1550 nm wavelength range. In one embodiment chip 200 may receive the first, second, and third wavelengths in a port layer from an external system, and then route the first and third wavelengths to different photonic devices in the device layer. In another embodiment chip 200 may receive in operation the first wavelength $\lambda_1$ mixed with the pump wavelength $\lambda_2$ and route the first wavelength to the first device 140a while blocking the second wavelength from the device layer, and the second device 140b may transit the third wavelength $\lambda_3$ to be output from the chip via the port waveguide.

Figure 7:
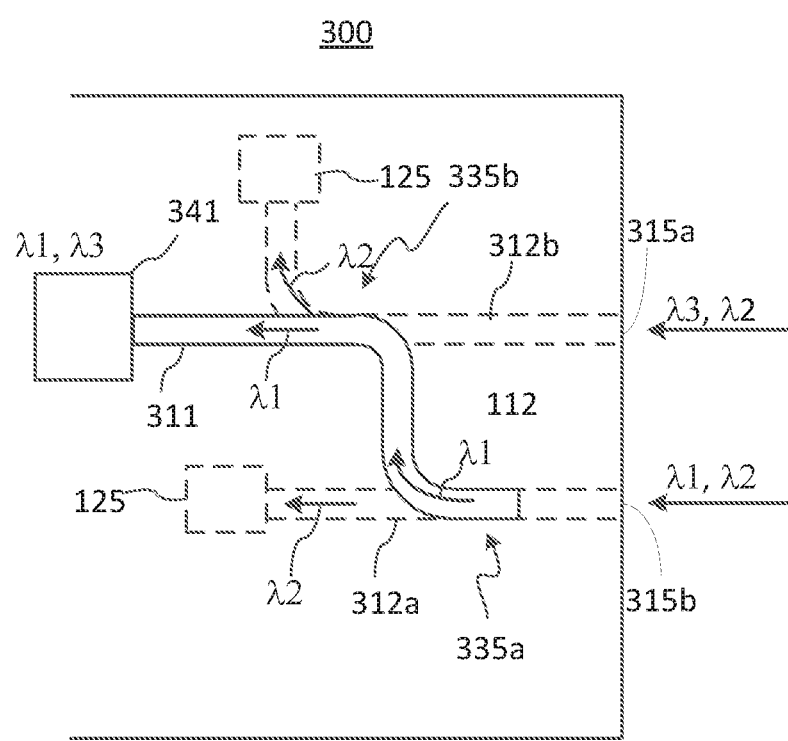
FIG. 7 is a schematic block diagram illustrating a plan view of an optical chip with two input/output waveguide in the port layer coupled to a same waveguide in the device layer.

Referring now to FIG. 7, there is illustrated in a plan view a portion of a photonics chip 300 which includes a device layer and a second layer below the device layer, as generally described hereinabove with reference to FIGS. 2A-3. In FIG. 7 elements implemented in the device layer are shown with solid lines, while elements in the second layer, which may be either below or above the device layer, are shown with dashed lines. A first optical device 341 and a first waveguide 311 for optically connecting thereto are formed in the device layer. The second or port layer includes a first port waveguide 312a and a second port waveguide, each terminating at one end with an edge coupler or port 315a or 315b for connecting to an external optical system (not shown). The two port waveguides 312a and 312b may each optionally terminate at another end with an absorber 125, or be coupled thereto, for absorbing light remaining in the respective port waveguide. The device waveguide 311 is routed so as to form two consecutive two-layer wavelength selective optical couplers 335a and 335b with the first and second port waveguides 312a and 312b, respectively, each in a manner generally as described hereinabove with reference to FIGS. 2A and 3, and the device and port waveguides shown therein. Port waveguide 312a and the first waveguide 311 may be coupled at coupler 335a at the first wavelength $\lambda_1$ but decoupled at the second wavelength $\lambda_2$, while port waveguide 312b and the first waveguide 311 may be coupled at the third wavelength $\lambda_3$ but decoupled at the second wavelength $\lambda_2$, and in some embodiments may also be decoupled at the first wavelength $\lambda_1$. By way of example, $\lambda_2$ may be a 980 nm pump wavelength of an external optical amplifier, and the first and third wavelengths $\lambda_1$, $\lambda_3$ may be two different communication wavelengths, for example in the 1550 nm wavelength range. In the illustrated embodiment chip 300 may receive in operation the first wavelength $\lambda_1$ mixed with the pump wavelength $\lambda_2$ into the first port waveguide 312a, and the third wavelength $\lambda_3$ mixed with the pump wavelength $\lambda_2$ into the second port waveguide 312b. The first waveguide 311 of the device layer will pick up the first and third wavelengths at couplers 335a, 335b respectively and guide them to the optical device 341, while the pump wavelength $\lambda_2$ received in the port waveguide 312a, 312b will remain with the respective port waveguides. In another embodiment chip 300 may receive in operation the first wavelength $\lambda_1$ mixed with the pump wavelength $\lambda_2$ into the first port waveguide 312a, and may output the third wavelength $\lambda_3$ from the second port waveguide 312b while also receiving in the second port waveguide the pump wavelength $\lambda_2$. In another embodiment the optical device 341 may transmit the first and third wavelengths, with the two-layer couplers 335a, 335b operating as a wavelength demultiplexing pump filter that sends the first and third wavelengths out of the chip via port waveguides 312a and 312b respectively, while blocking pump light from an external optical amplifier from entering the device layer of the chip. Thus, the two-layer coupler arrangement of chip 300 may function as a wavelength multiplexing pump filter that block pump light from entering the device layer of the chip while allowing the device layer to communicate with an external system at the signal wavelengths via the port layer.

Figure 8:
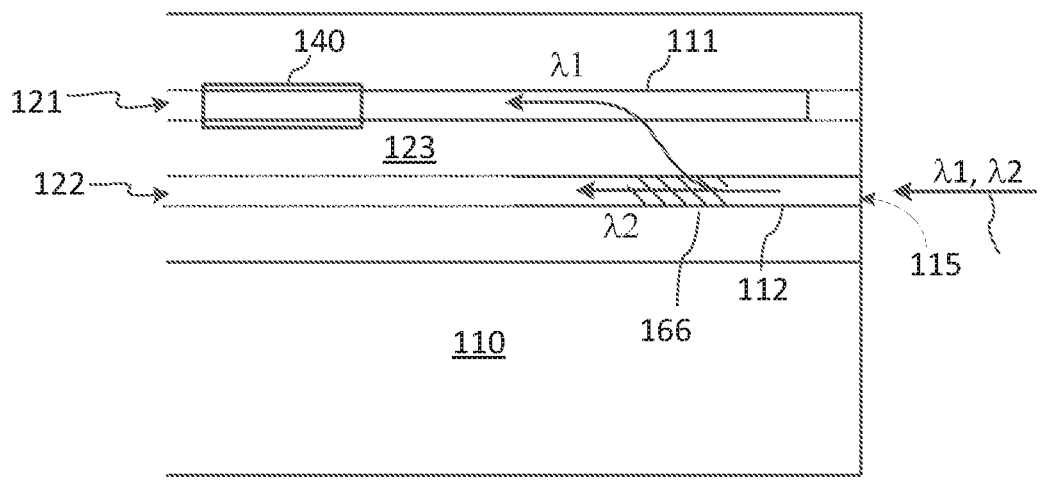
FIG. 8 is a schematic side view of a vertical grating coupler optically coupling waveguides in the port and device layers.

In some embodiments the two-layer coupler formed by waveguides of the device and port layers may be in the form of, or include, a grating coupler configured to couple the respective waveguides at a selected wavelength. Such a grating coupler may be implemented by a forming a suitable vertically-coupling diffraction grating in one or both of the device and port waveguides in the coupling region where the port-layer and device-layer waveguides are collinearly disposed one over the other, and the grating is design to couple a selected wavelength between the waveguides. FIG. 8 illustrates an embodiment of chip 100 with a vertically-coupling grating 166 implemented in the port waveguide 112. Such a grating coupler may provide wavelength selectivity that enables to discriminate between different DWDM channels, as may be required in at least some versions of the embodiments illustrated in FIGS. 6 and 7.

Figure 9:
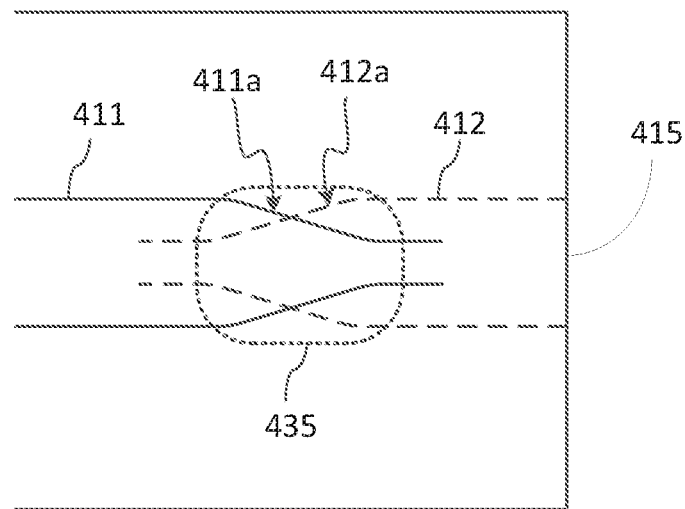
FIG. 9 is a schematic plan view of a two-layer adiabatic coupler optically coupling waveguides in the port and device layers.

Turning to FIG. 9, in some embodiments a two-layer coupler optically connecting the device and port layers of a chip, such as those described hereinabove with reference to FIGS. 2-8, may be implemented as an adiabatic coupler 435 in which one or each of two coupled waveguides 411, 412, which lie in different layers, are tapered within the coupling region. In the illustrated example waveguide 411 is disposed in a device layer of the chip and includes a tapered second 411a within the coupling region, and waveguide 412 is disposed in a port layer of the chip and includes a tapered second 412a within the coupling region. The tapered portions of the waveguides may be designed so that the longer-wavelength light of the communication wavelengths is squeezed out from the waveguide in which it enters the two-layer adiabatic coupler 435 into the other of the two waveguides, while the shorter-wavelength pump light which may enter the chip through second-layer port 415 will remain with the port waveguide 412 past coupler 435.

Advantageously, connecting a photonic chip to an external circuit at a port layer that is different from the device layer of the chip facilitates filtering out undesired input wavelengths within the chip itself. By providing a wavelength selective coupling between the port and device layers, only signal, or generally desired, wavelengths may be transmitted to or from the device layer, while the undesired wavelengths do not enter the device layer of the chip, or at least their coupling into the device layer is substantially suppressed. Pump radiation in particular can be kept separate from the device layer of a silicon photonics chip by connecting the chip at a dielectric layer, for example a layer of SiN, where the pump wavelength can transparently propagate without causing extra loss for signal wavelengths.

Figure 10:
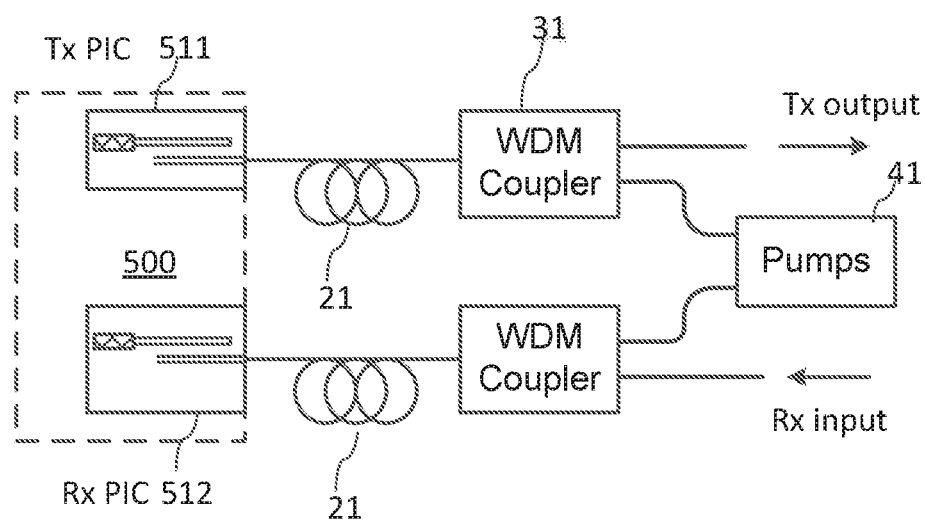
FIG. 10 is a schematic block diagram illustrating a simplified optical circuit of an optical transceiver cite with an integrated optical transceiver connecting to optical post- and pre-amplifiers at a port layer separate from the device layer.

Referring now to FIG. 10, there is illustrated an example connection of a silicon-based optical transceiver 500 having features of the present disclosure to an optical communication link. Transceiver 500 includes a transmitter (Tx) PIC 511 and a receiver (Rx) PIC 512, each of which connecting to a respective external EFDA 21 at a port layer that is different from the device layer, and having a two-layer coupler that substantially blocks pump light from entering the device layer. Because of this build-in pump blocking feature of the PICs 511, 512, each EDFA 21 may be pumped in the direction towards the transceiver 500, thereby eliminating the need for optical isolators either between the EDFAs 22 and the PICs 511, 512 or the EDFAs and the optical link, thereby reducing the number of optical components and fiber splices in the system.

Figure 11:
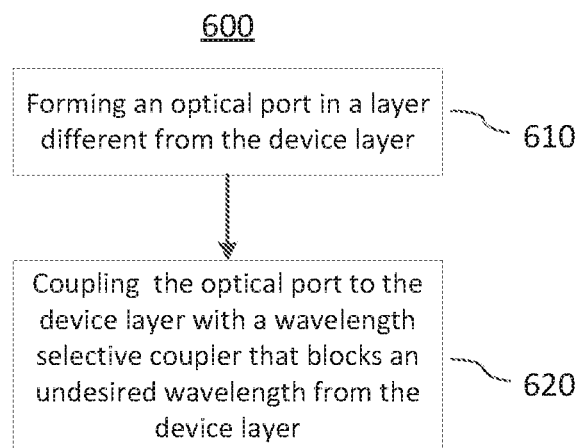
FIG. 11 is a flowchart of a method for blocking an undesired wavelength from a device layer of a chip.

Referring to FIG. 11, an aspect of the present disclosure provides method 600 for blocking a second wavelength $\lambda_2$, which may be present in an external optical system to which a photonic chip may be connected, from a device layer of the photonic chip that is configured to operate at a first wavelength $\lambda_1$. The method includes step 610 of forming a port waveguide for connecting to the external system in a second layer of the photonic chip that is spaced from the device layer. The method further includes step 620 of optically coupling the port waveguide to a device waveguide disposed in the device layer in a wavelength selective manner, so that the device waveguide is optically coupled to the port waveguide at the first wavelength $\lambda_1$ but is substantially optically decoupled at the second wavelength $\lambda_2$, so that the second wavelengths $\lambda_2$ received in the port waveguide remains in the port waveguide without being coupled into the device layer.

Figure 12:
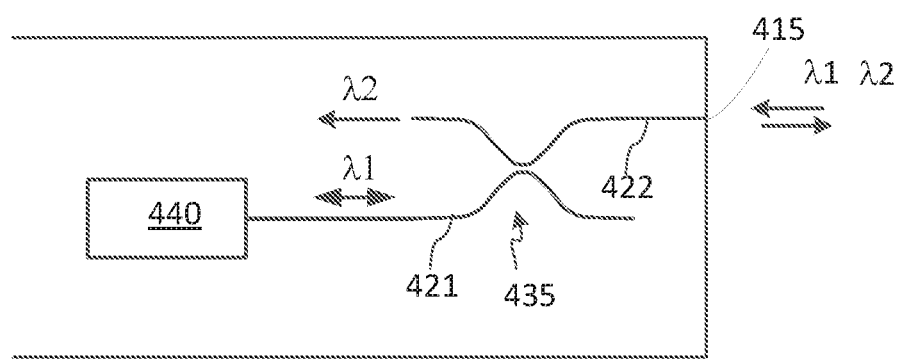
FIG. 12 is a schematic diagram of a planar input coupler of a photonic chip for blocking an undesired input wavelength.

Referring to FIG. 12, in some embodiments both a device waveguide 421 that connects to a photonic device 440 and a port waveguide 422 that connects to an optical port 415 of the chip may be formed in a same layer, and may be coupled to each other with a wavelength selective planar optical coupler 435 that is configured to couple the port and device waveguide at a signal wavelength λ1 but not at a second wavelength λ2 that may be present in the external system. In some embodiments the port waveguide 422 may be formed of a different material than the device waveguide. For example the device waveguide 421 may be absorptive at the second wavelength while the port waveguide may be transmissive at the second wavelength. The port waveguide 422 may be configured to route the second wavelength away from the device 440.

Example embodiments described hereinabove utilized a port layer spaced from a device layer and two-layer optical couplers to isolate the device layer of an optical chip from light of an undesired wavelength. Advantageously, similar two-layer chip configurations may also be used to implement other light processing operations on input light prior its entering the device layer, when so desired. By way of example, input signal light may be high in optical power so as to result in undesired non-linear absorption in the device layer of the chip or other undesired non-linear effects. In such embodiments two or more two-layer optical couplers may be used to couple portions of the input light into separate waveguides in the device layer, each light portion being of a low enough optical power to minimize undesirable non-liner effects. In some embodiments the same two-layer optical couplers may also be configured to block undesired wavelengths from the device layer. In some embodiments a two-layer optical coupler may be configured to couple only a desired fraction of the signal light entering the port layer into the device layer.

Figure 13:
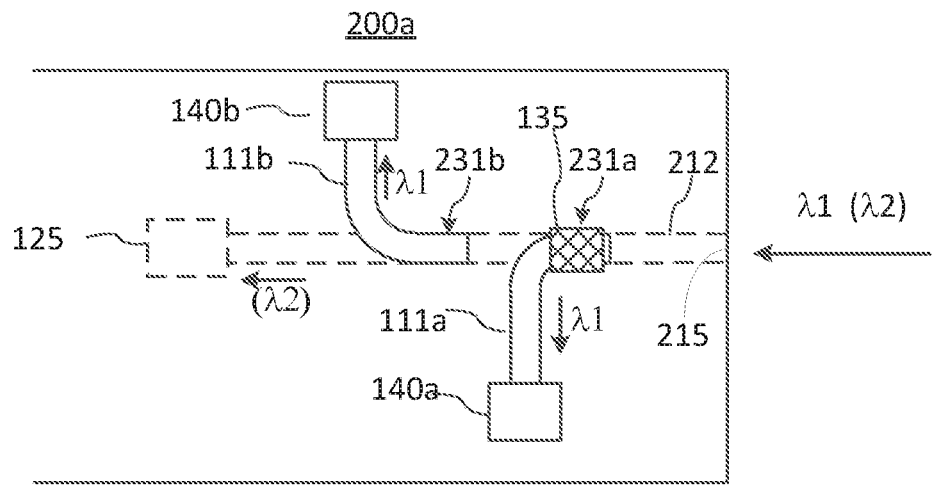
FIG. 13 is a schematic plan view of an optical chip of FIG. 6 with a tunable two-layer optical coupler adjustably connecting a device layer of the chip with a port layer.

Referring to FIG. 13, there is schematically illustrated a photonic chip 200a, which is as a variation of chip 200 of FIG. 6 and may include substantially the same or similar elements, except that a first two-layer coupler 231a is configured to couple a pre-defined fraction of light of the first wavelength $\lambda_1$ from port waveguide 212 into first device waveguide 111a, with remaining light of the first wavelength $\lambda_1$ propagating further along the port waveguide 212 to be coupled into the second device waveguide 111b by the second two-layer coupler 231b. For example, the first two-layer coupler 231a may be configured as a 50/50 optical splitter to couple half of the optical power in the first wavelength $\lambda_1$ from the port waveguide 212 into the first device waveguide 111a. In some embodiments the first coupler 231 may be a tunable coupler configured to couple an adjustable portion of the signal light into the first device waveguide 111a. For example a tuning element 135, such as a heater or a p/n junction, may be provided at the coupling portion of the first waveguide 111a to vary the refractive index thereof. In some embodiments the port waveguide 212 may be coupled to more than two device waveguides using a succession of two-layer optical couplers, each configured to couple a pre-defined fraction of the optical power of a signal wavelength into a separate device-layer waveguide.

Figure 14:
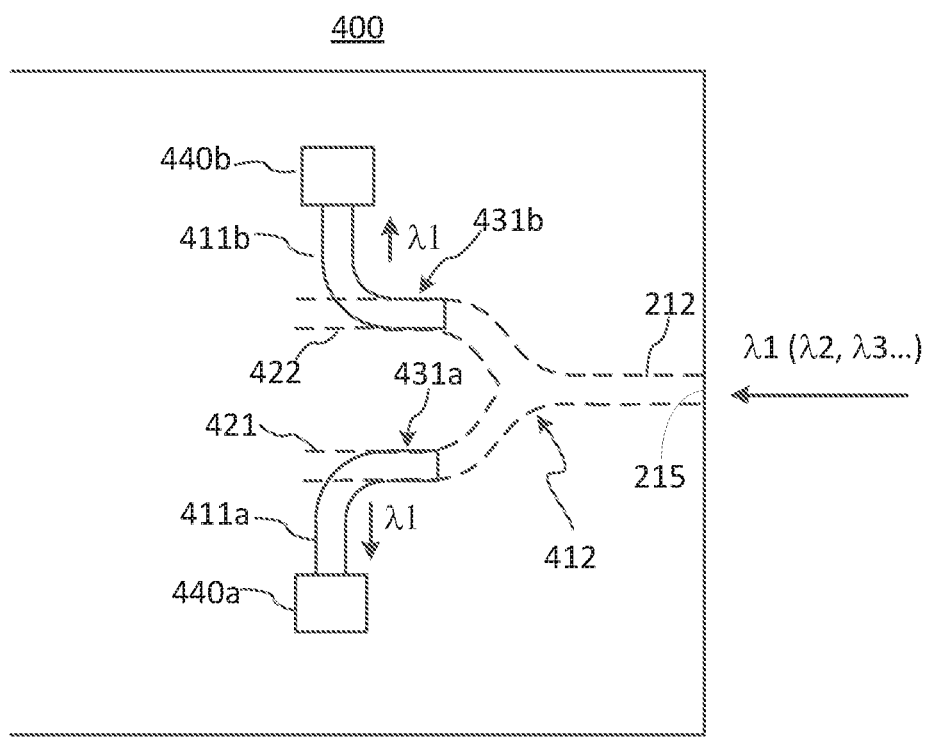
FIG. 14 is a schematic plan view of an optical chip with an optical power splitter in the port layer.

Referring to FIG. 14, there is schematically illustrated a photonic chip 400, which includes an optical splitter 412 in the port layer thereof. Similarly to previous figures, device-layer elments in FIG. 14 are shown with solid lines, while port-layer elements are shown with dashed lines. The device layer includes a first device waveguide 411a and a second device waveguide 411b, each optionally connected to a respective photonic device 440a or 440b. The port layer includes the optical splitter 412 that splits input light received from the input port 215 into two smaller light portions, and directs them separately into first and second port waveguides 421, 422, to be coupled separately into the first and second device waveguides 411a, 411b by first and second two-layer optical couplers 431a and 431b. In some embodiments the two-layer optical couplers 431a and 431b may be configured to couple a signal wavelength $\lambda_1$ between the device and port layers but block a second wavelength $\lambda_2$, for example an EDFA pump wavelength, from entering the device waveguides as described hereinabove. In some embodiments splitter 412 may split input light at the signal wavelength $\lambda_1$ equally between the port waveguides 421, 422. In some embodiments input light at the signal wavelength $\lambda_1$ may be split by the splitter 412 unequally between the port waveguides 421, 422. In some embodiments input light may include a plurality of wavelength channels $\lambda_1$, $\lambda_2$, $\lambda_3$, and splitter 412 may be configured to have different splitting ratios for different wavelength channels.

In example embodiments described hereinabove light is coupled in or out of a photonic chip through one port waveguide formed in a port layer of the chip that is spaced apart from a device layer of the chip. However, edge couplers formed of a group of closely spaced waveguide cores, such as those described hereinabove in U.S. Pat. Nos. 9,588,298 and 9,766,408, both of which are assigned to the assignee of the present application and are incorporated herein by reference, may provide superior coupling performance. Such waveguide cores may be disposed in two or more port layers forming a composite input/output optical port. One or more of the waveguide cores may taper out to a larger dimension away from the chip's edge, where they can be coupled to waveguide in a device layer, in a wavelength selective manner if desired. In the context of the present specification waveguide cores are referred to as waveguides for simplicity.

Figure 15:
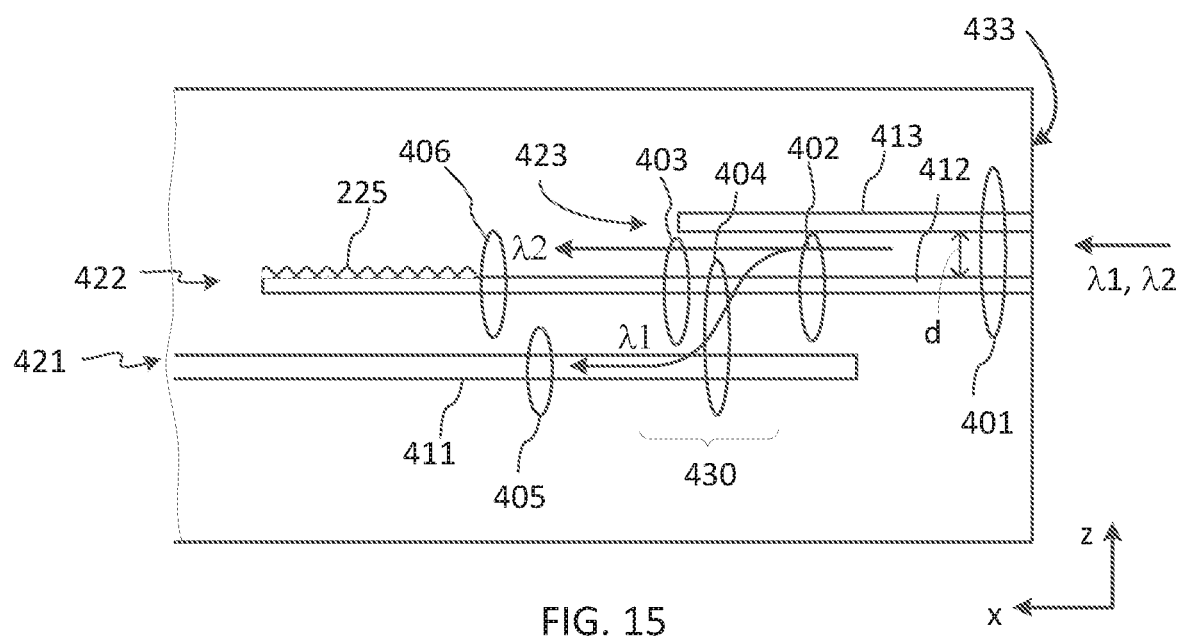
FIG. 15 is a schematic diagram illustrating an embodiment of the photonic chip of FIG. 1 with a multi-tip optical port formed with two port layers in a side cross-sectional view.
Figure 16:
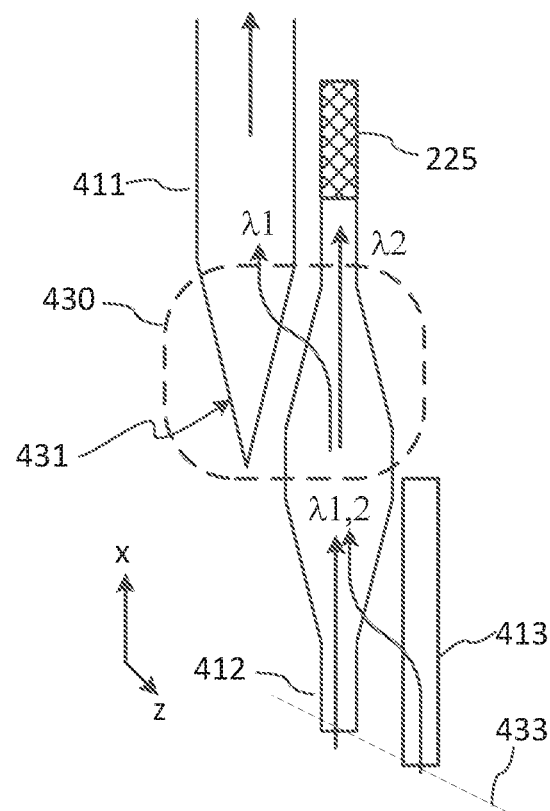
FIG. 16 is a schematic diagram illustrating input waveguide coupling in an embodiment of the photonic chip of FIG. 15.

Referring to FIG. 15, there is illustrated a front portion of a photonic chip with two or more port waveguides 413, 412 formed in two spaced port layers 423, 422 formed over a device layer 421. By way of example, port layers 412, 413 may be layers of SiN while the device layer 421 may be a Si layer, with SiOx as a surrounding cladding, although other combination of suitable materials are possible. The port layers 423, 422 may be spaced suitably close to each other to enable evanescent coupling therebetween in the wavelength range of operation. For example they may be spaced in the vertical direction (z) by d~1 to 2.5 microns (μm) for operating in λ~1.55 μm range. Although only one port waveguide is shown in each port layer, in some embodiments there may be two or more port waveguides in each port layer, which may be suitably closely spaced for evanescent coupling in the operating wavelength range to form a composite waveguide. Input light, for example from an optical fiber that may be butt-coupled to a chip facet 433, may have a mode cross-section 401 encompassing both port waveguides 412, 413, so that the input light enters the chip guided by the two or more port waveguides 412, 413. One of the port waveguides 412, 413 that it is closest to the device waveguide 411, i.e. the intermediate port waveguide 412 in FIG. 15, may taper out to a greater dimension away from the chip facet 433 as illustrated in FIG. 16, so that the input light of the first and second wavelengths congregates therein as it propagates into the chip, as schematically illustrated by a mode field cross-section 402. The port waveguide 412, or a group of port waveguides where the input light congregates, may be referred to as the main port waveguide 412; it may be disposed to be in optical communication with a coupling section 431 of the device waveguide to form an inter-layer coupler 430, which may be configured to be frequency-selective. In one embodiment the inter-layer coupler 430 may be configured so that light of the first wavelength $\lambda_1$ progressively couples into the device waveguide 411 as illustrated by the mode field cross-section 404, and is guided by the device waveguide 411 into the chip away from the inter-layer coupler 430 as illustrated by the mode field cross-section 405. Light of the second wavelength $\lambda_2$ remains with the main port waveguide 412 past the inter-layer coupler 430, as illustrated by the mode field cross-section 406, and may be absorbed by an optional absorber 225.

Referring to FIG. 16, there is illustrated one possible configuration of the port waveguide 413, 412 and the device waveguide 411 in a semi-perspective view, in which the waveguides are displaced in the plane of the figure for a clearer view. It will be appreciated that the optical axes of all three waveguides 411, 412, and 413 may be vertically aligned and spaced along the z-axis that is normal to the plane of the substrate. At input facet 433, light of the first and second wavelengths $\lambda_1, \lambda_2$ is first commonly guided by input sections of the port waveguides 412, 413, which form a composite waveguide. Further into the chip, i.e. in the x-axis direction, the intermediate port waveguide 412 flares out, and the light of both wavelengths congregates therein. Further away from input facet 433 the intermediate port waveguide 412 may taper in to a smaller dimension which size may be selected so as to support the second wavelength $\lambda_2$ but not the first wavelength $\lambda_1 > \lambda_2$, thus causing the first wavelength to decouple from port waveguide 412 and be picked up by the device waveguide 411, which may flare out in the coupling region 430 to effectively attract the first wavelength $\lambda_1$. In other embodiments the inter-layer coupler 430 may be configured as a directional coupler which length is selected so that at its distal end the first wavelength $\lambda_1$ is predominantly coupled into the device waveguide 411 while the second wavelength $\lambda_2$ stays predominantly with port waveguide 412.

In some embodiments port waveguides 412, 413 may be configured so that the optical coupling between them is wavelength selective, with light of the second wavelength $\lambda_2 < \lambda_1$ that is initially coupled into the second port waveguide 413 mostly staying with the second port waveguide 413 and away from the device waveguide, thereby further enhancing the isolation of the device layer 421 from an external system at the second wavelength $\lambda_2$.

Figure 17:
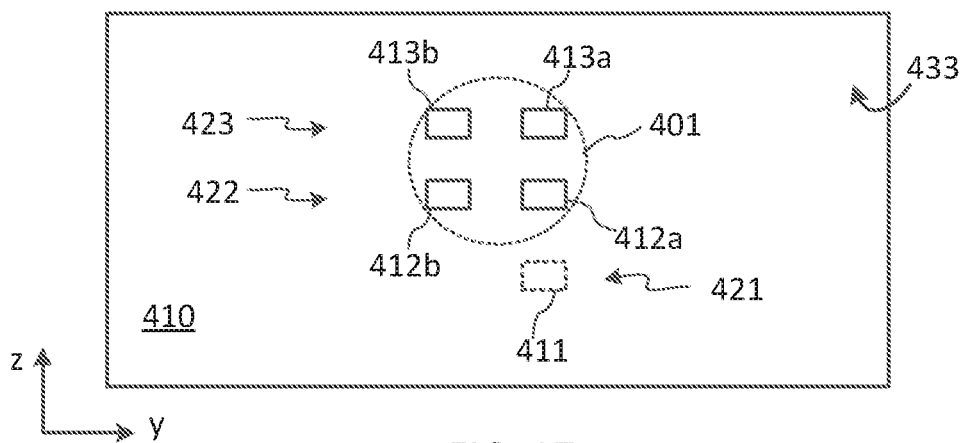
FIG. 17 is a schematic diagram illustrating a four-core embodiment of the multi-tip optical port of the photonic chip of FIG. 15 in a front cross-sectional view.

Turning to FIG. 17, there is illustrated a front view of an embodiment of the photonic chip of FIG. 15 with four port waveguides 413a, 413b, 412a, 412b in two port layers 423, 422. The device waveguide 411 is also shown, which may be vertically aligned with one of the port waveguides of the intermediate port layer 422, and which proximal to the chip facet 433 end may be optionally offset into the chip. The four port waveguides 413a, 413b, 412a, 412b may be spaced to fit into a mode field cross-section 401 of input light, and form a composite waveguide port of the chip. Further into the chip away from the facet 433, port waveguide 412a, which may be aligned vertically with the device waveguide 411, may taper out to a greater dimension as illustrated in FIG. 16, so as to concentrate the input light of all or some of the received wavelengths about it, so that the input light of desired wavelengths can then be coupled into the device waveguide 411. It will be appreciated that in other embodiments there may be more than two port layers in a chip, each of which having two or more port waveguides, so as to form a composite waveguide port composed of a two-dimensional waveguide array. In some embodiments individual port waveguides may be configured for wavelength-selective coupling therebetween, so that the distribution of input wavelength among the port waveguides evolves in a desired manner away from the chip's facet.

Figure 18:
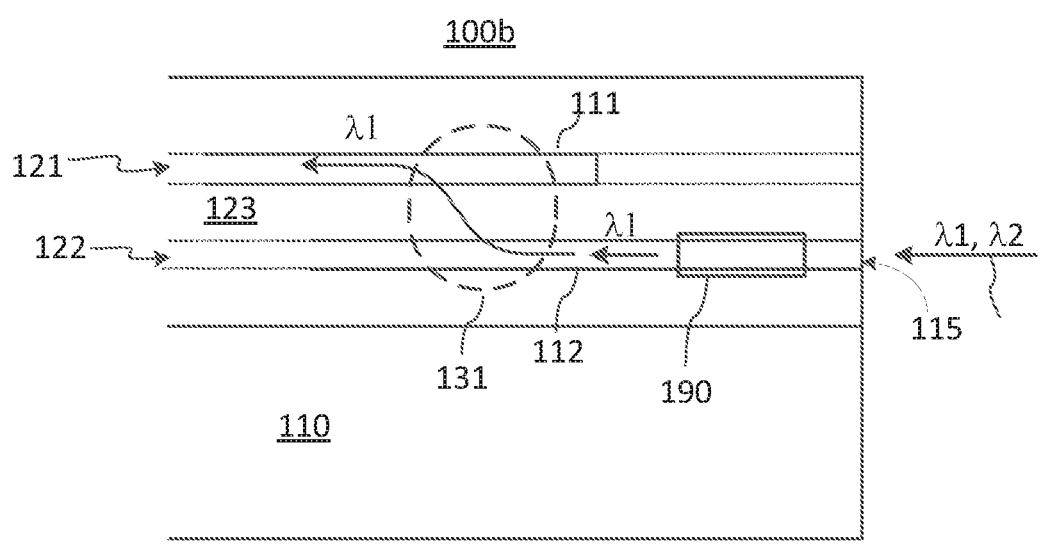
FIG. 18 is a schematic diagram illustrating an embodiment of the photonic chip of FIG. 1 with a wavelength filter in the port layer.

Referring to FIG. 18, there is illustrated an embodiment 100b of the photonic chip of FIG. 1 which includes an input wavelength filter 190 in the port layer 122. The wavelength filter 190 may be embodied in any suitable form, including but not limited to a waveguide Bragg grating, a micro-ring, a micro-disk, an array waveguide grating, a blazed grating, and a Mach-Zehnder interferometer. The input wavelength filter 190 may provide additional wavelength selectivity thereby enhancing the isolation of the device layer from the outside system at undesired wavelength or wavelengths. In this embodiment the inter-layer coupler 131 may or may not be wavelength-selective.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings.

For example, it will be appreciated that different dielectric materials and semiconductor materials other than silicon, including but not limited to compound semiconductor materials of groups commonly referred to as A3B5 and A2B4, such as GaAs, InP, and their alloys and compounds, may be used to fabricate the optical circuits example embodiments of which are described hereinabove. Furthermore, in some embodiments the two-layer optical couplers described hereinabove may be polarization-selective and configured to predominantly couple one polarization of input light between the port and device waveguides. In other embodiments the optical couplers described hereinabove may be polarization-insensitive so as to equally couple orthogonal polarizations of light between the port and device waveguides. The two-layer optical couplers may be configured to couple a first range of wavelength between the port and device layers while keeping these layers decoupled at a second set of wavelength. It will be understood by one skilled in the art that various other changes in detail may be affected therein without departing from the spirit and scope of the invention as defined by the appended claims.

What is claimed is:

1. A photonics chip comprising:
   at least one port layer;
   a device layer disposed above or below the at least one port layer;
   an optical port disposed at the at least one port layer for connecting optically to an external optical system at a first wavelength the external optical system including a source of a second wavelength $\lambda_2$;
   wherein the at least one port layer comprises a first port waveguide in optical communication with the optical port;
   wherein the device layer comprises a first device waveguide in optical communication with the first port waveguide at the first wavelength $\lambda_1$; and,
   wherein the first device waveguide is substantially optically decoupled from the first port waveguide at the second wavelength $\lambda_2$.

2. The photonics chip of claim 1 wherein the first device waveguide is transparent at the first wavelength $\lambda_1$ and is absorptive at the second wavelength $\lambda_2$, and the first port waveguide is transparent at the first and second wavelengths $\lambda_1$ and $\lambda_2$.

3. The photonics chip of claim 2 wherein the device layer comprises semiconductor material and the at least one port layer comprises dielectric material.

4. The photonics chip of claim 1 wherein the second wavelength is an optical pump wavelength for pumping an external optical amplifier.

5. The photonics chip of claim 1 further comprising a photonics device in optical communication with the first device waveguide.

6. The photonics chip of claim 1 further comprising an optical absorber coupled to the first port waveguide for absorbing the second wavelength.

7. The photonics chip of claim 1 wherein the first port waveguide and the first device waveguide are disposed to form a two-layer wavelength-selective coupler that is configured to transfer light of the first wavelength $\lambda_1$ between the first port waveguide and the first device waveguide while substantially preventing light of the second wavelengths $\lambda_2$ from being coupled into the first device waveguide from the first port waveguide.

8. The photonics chip of claim 7 wherein the two-layer wavelength-selective coupler comprises a section of the first device waveguide that extends directly over or under a section of the first port waveguide along a coupling length that is selected so that the first device waveguide and the first port waveguide are optically coupled at the first wavelength $\lambda_1$ and optically decoupled at the second wavelengths $\lambda_2$.

9. The photonics chip of claim 7 wherein the two-layer wavelength-selective coupler is an adiabatic optical coupler formed of a section of the first device waveguide extending directly over or under a section of the first port waveguide, wherein at least one of the sections is tapered.

10. The photonics chip of claim 1 wherein the first port waveguide terminates at an edge of the photonic chip to form the optical port.

11. The photonics chip of claim 1 wherein one of the first device waveguide and the first port waveguide comprises a grating coupler configured to couple the device waveguide to the first port waveguide at the first wavelength.

12. The photonics chip of claim 1 wherein the device layer further comprises a second device waveguide disposed to be optically coupled with the first port waveguide at the first wavelength $\lambda_1$ or a third wavelength $\lambda_3$ while being optically decoupled from the first port waveguide at the second wavelength $\lambda_2$.

13. The photonics chip of claim 1 wherein the at least one port layer further comprises a second port waveguide for connecting to the external optical system at the first wavelength $\lambda_1$ or a third wavelength $\lambda_3$, and wherein the first device waveguide comprises a second coupling portion disposed to be optically coupled with the second port waveguide at the first wavelength $\lambda_1$ or third wavelength $\lambda_3$ while being optically decoupled from the first device waveguide at the second wavelength $\lambda_2$.

14. The photonics chip of claim 1 wherein:
the at least one port layer further comprises a second port waveguide and an optical splitter disposed to split light received from the optical port in power between the first port waveguide and the second port waveguide before coupling to the device layer, and
the device layer further comprises a second device waveguide in optical communication with the second port waveguide at the first wavelength $\lambda_1$.

15. The photonics chip of claim 3 wherein the device layer comprises a silicon layer, and wherein the at least one port layer comprises one of silicon nitride, silicon oxynitride, or silica.

16. A method for blocking a second wavelength from a device layer of a photonic chip that is configured to operate at a first wavelength, the method comprising:
forming a port waveguide for connecting to an external system in a second layer of the photonic chip that is disposed over or under the device layer in a direction perpendicular to the device layer, the external system comprising a source of the second wavelengths; and,
optically coupling the port waveguide to a device waveguide disposed in the device layer in a wavelength selective manner so that the device waveguide is optically coupled to the port waveguide at the first wavelength $\lambda_1$ but is substantially optically decoupled at the second wavelength $\lambda_2$, so that the second wavelengths $\lambda_2$ received in the port waveguide remains in the port waveguide without being coupled into the device layer.

17. The method of claim 16 comprising configuring the port waveguide and the device waveguide to extend directly one over the other along a coupling length that is selected for coupling at the first wavelength and for blocking the second wavelength from coupling into the device layer.

18. The method of claim 16 comprising using an etch stop layer of the photonic chip as the second layer.

19. The method of claim 16 comprising providing an optical absorber optically coupled to the port waveguide.

20. The method of claim 16 comprising using a semiconductor layer of the chip as the device layer, and a dielectric layer of the chip as the second layer.

* * * * *